US011676052B2

(12) United States Patent
Bell et al.

(10) Patent No.: US 11,676,052 B2
(45) Date of Patent: Jun. 13, 2023

(54) APPARATUSES AND METHODS FOR INFERENCE PROCESSING ON EDGE DEVICES

(71) Applicant: MICRON TECHNOLOGY, INC., Boise, ID (US)

(72) Inventors: Debra M. Bell, Boise, ID (US); James S. Rehmeyer, Boise, ID (US); Brett K. Dodds, Boise, ID (US); Anthony D. Veches, Boise, ID (US); Libo Wang, Boise, ID (US); Di Wu, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 404 days.

(21) Appl. No.: 16/849,819

(22) Filed: Apr. 15, 2020

(65) Prior Publication Data

US 2021/0326732 A1 Oct. 21, 2021

(51) Int. Cl.
*G06N 5/047* (2023.01)
*G06N 20/00* (2019.01)
*H04L 67/12* (2022.01)
*H04L 67/10* (2022.01)
*H04L 9/40* (2022.01)
*G16Y 10/75* (2020.01)

(52) U.S. Cl.
CPC ............. *G06N 5/047* (2013.01); *G06N 20/00* (2019.01); *H04L 63/1408* (2013.01); *H04L 67/10* (2013.01); *H04L 67/12* (2013.01); *G16Y 10/75* (2020.01)

(58) Field of Classification Search
None
See application file for complete search history.

(56) References Cited

U.S. PATENT DOCUMENTS

| 6,697,383 | B1 | 2/2004 | Li et al. | |
| 11,191,013 | B1* | 11/2021 | Kalkunte | H04W 64/003 |
| 11,410,713 | B2* | 8/2022 | Wu | G11C 7/1078 |
| 11,442,940 | B2* | 9/2022 | Bell | G11C 11/407 |
| 2004/0151382 | A1* | 8/2004 | Stellenberg | H04L 63/1416 382/219 |
| 2005/0111446 | A1* | 5/2005 | Greaves | H04L 49/351 370/389 |

(Continued)

FOREIGN PATENT DOCUMENTS

KR 102042690 B1 11/2019

OTHER PUBLICATIONS

ISR/WO dated Jul. 29, 2021 for PCT Appl. No. PCT/US2021/027013.

*Primary Examiner* — Lashonda Jacobs-Burton
(74) *Attorney, Agent, or Firm* — Dorsey & Whitney LLP

(57) ABSTRACT

Embodiments of the disclosure are drawn to apparatuses, systems, methods for an internet of things (IoT) system to include edge devices that perform at least some functions without communicating with a cloud computing system. An edge device may include a memory with on-memory pattern matching capabilities. The edge device may perform pattern matching operations on data collected by the edge device or sensors in communication with the edge device. Based on results of the pattern matching operations, the edge device may perform various functions, such as transmitting data to the cloud computing system, activating an alarm, and/or changing a frequency at which data is transmitted.

23 Claims, 5 Drawing Sheets

(56) References Cited

U.S. PATENT DOCUMENTS

| | | | |
|---|---|---|---|
| 2011/0295894 A1* | 12/2011 | Yoo | H04L 63/1416 |
| | | | 707/E17.014 |
| 2012/0150887 A1* | 6/2012 | Clark | G06F 16/90344 |
| | | | 707/758 |
| 2013/0204997 A1* | 8/2013 | Eggleston | H04L 43/0882 |
| | | | 709/223 |
| 2015/0279466 A1* | 10/2015 | Manning | G11C 7/1006 |
| | | | 365/49.17 |
| 2016/0085721 A1* | 3/2016 | Abali | G06F 9/3001 |
| | | | 712/15 |
| 2017/0353367 A1* | 12/2017 | Slaight | H04L 43/10 |
| 2019/0281132 A1* | 9/2019 | Sethuraman | H04L 67/303 |
| 2019/0342393 A1* | 11/2019 | Bhattacharya | H04L 67/61 |
| 2019/0369984 A1 | 12/2019 | Malladi et al. | |
| 2019/0392328 A1 | 12/2019 | Gil Bulacio et al. | |
| 2020/0177458 A1* | 6/2020 | Rahman | H04L 41/0631 |
| 2020/0272899 A1* | 8/2020 | Dunne | G06N 3/08 |
| 2021/0263847 A1* | 8/2021 | Rehmeyer | G11C 15/04 |
| 2021/0279942 A1* | 9/2021 | Petkov | G06T 7/50 |

\* cited by examiner

APPARATUSES AND METHODS FOR INFERENCE PROCESSING ON EDGE DEVICES

BACKGROUND

Interest in Internet of Things (IoT) systems is on the rise, where IoT generally refers to systems where data may be collected from various devices (e.g., things) in an environment and the data may be processed or otherwise utilized to make decisions, conduct business, or generally improve life. Typically, sensors and/or edge devices with limited computing capabilities may be used to collect data and provide the data (or portions of the data or otherwise minimally processed data) to a central cloud computing system for more complex processing and/or decision making in combination with other data. For example, a smart speaker may receive audio data from a user, for example, the user may ask the smart speaker a question. The smart speaker may transmit the audio data to a cloud computing system for voice recognition processing. After processing the audio data, the cloud computing system may provide the answer to the user's question to be provided to the user via the smart speaker's audio capabilities.

Examples described herein may also include memory devices, including volatile memory, such as dynamic random access memory (DRAM). Data may be stored in individual memory cells of the DRAM. The memory cells may be organized in an array of rows and columns. Each memory cell in a row may be coupled to a word line and each memory cell in a column may be coupled to a bit line. Thus, every memory cell is coupled to a word line and a bit line. Data may be provided to and retrieved from the DRAM for performing various computations by a microprocessor, graphical processing unit, or other circuitry, such as an application specific integrated circuit (ASIC), all of which is generally referred to as processing circuitry.

While IoT systems utilizing cloud computing to handle the majority of the computational burden may permit edge devices to remain small and/or inexpensive, the transmission of data between edge devices and the cloud may lead to undesirable delays and/or use significant bandwidth.

DETAILED DESCRIPTION

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Figure 1:
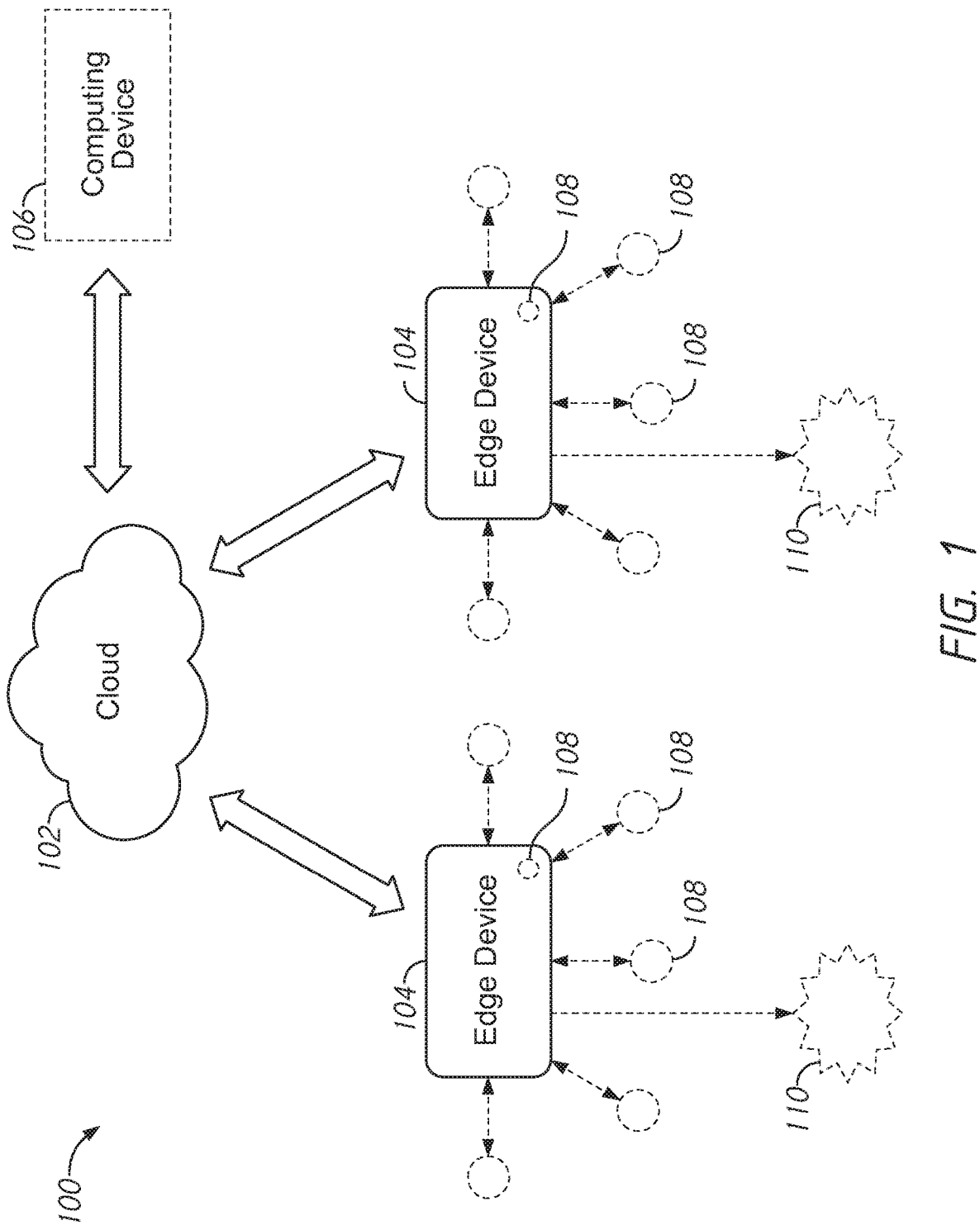
FIG. 1 is a block diagram of an Internet of Things (IoT) system.

An example of an IoT system 100 is illustrated in FIG. 1. The IoT system 100 includes a cloud computing system 102 and one or more edge devices 104. The IoT system 100 may further include another computing device 106 and/or one or more sensors 108. The cloud computing system 102 may include one or more computing devices (e.g., servers) for performing computations. The computations may be performed in parallel across multiple computing devices in the cloud computing system 102. While a cloud computing system 102 is depicted and described, it is to be understood that other computing systems may be used additionally and/or instead, such as a central computing system, an enterprise computing system, and/or one or more computers or other processing devices.

The edge device 104 may collect data and provide the collected data to the cloud computing system 102 via a wireless network, a wired network, or a combination thereof. The cloud computing system 102 may perform computations based, at least in part, on the data provided by the edge devices 104. In some applications, the cloud computing system 102 may combine the data received from multiple edge devices 104 for performing the computations. For example, multiple edge devices 104 may be located on a bridge and the cloud computing system 102 may combine the data from the edge devices 104 to compute a status (e.g., safe, unsafe) of the bridge. The cloud computing system 102 may use one or more of a variety of techniques to process the data (e.g., machine learning, big data analysis). In some applications, the cloud computing system 102 may perform pattern matching operations (e.g., comparing data to patterns identified by a machine learning model during training).

In some applications, the cloud computing system 102 may provide a result of the computations to one or more of the edge devices 104 (e.g., the answer to the user's question provided to a smart speaker). Optionally, the cloud computing system 102 may provide the result (additionally or alternatively) to another computing device 106. The computing device 106 may be remote from the edge devices 104. Returning to the bridge example, the edge devices 104 may be located on the bridge and the computing device 106 may be at a central control center (e.g., department of transportation office building). In some cases, the computing device 106 may provide control signals to control the operations of the cloud computing system 102 and/or edge devices 104. For example, the computing device 106 may determine what types of computations the cloud computing system 102 performs on the data received from the edge devices 104. In another example, the computing device 106 may enable or disable one or more of the edge devices 104 (via the cloud computing system 102).

In some applications, the cloud computing system 102 may provide one or more control signals to the edge devices 104 which may cause the edge devices 104 to perform a function. For example, the control signal may cause the edge devices 104 to transmit collected data to the cloud computing system 102. In some applications, one or more of the control signals may be based, at least in part, on the result of the computations based on the data provided by the edge devices 104. Again returning to the bridge example, if the data provided indicates the bridge's status is deteriorating but is not yet considered unsafe, the control signal may cause the edge device 104 to transmit data to the cloud computing system 102 more frequently. In another example, if the data provided indicates that the bridge is unsafe, the control signal may cause the edge device 104 to activate an audible or visual alarm 110 (e.g., siren, flashing light) included in or in communication with the edge device 104.

Optionally, the edge devices 104 may include and/or may be in communication with one or more sensors 108 via a hardwire connection, a wireless connection, or a combination thereof. The sensors 108 may collect the data and provide it to the edge devices 104 for subsequent transmission to the cloud computing system 102. In the bridge example, the sensors 108 may include, but are not limited to, strain gauges, piezoelectric pressure sensors, and thermistors.

While IoT systems utilizing cloud computing to handle the majority of the computational burden may permit edge devices to remain small and/or inexpensive, the transmission of data between edge devices 104 and the cloud computing system 102 may lead to undesirable delays and/or use significant bandwidth. For example, if a bridge is unsafe, alarms at the bridge may need to be activated immediately. The time required to transmit information between the cloud computing system 102 and edge devices 104 may be longer than desired and/or there may be disruptions in the connections between the cloud computing system 102 and the edge devices 104. In another example, transmitting all of the data generated by the edge devices 104 and/or sensors 108 to the cloud computing system 102 may bog down communications between other devices in the system 100.

It would be desirable to have at least some computing tasks performed locally at the edge devices. For example, it may be desirable for the edge device to analyze the data to determine which data should be transmitted to the cloud computing system. In another example, it may be desirable for the edge device to detect certain critical states without interacting with the cloud computing system. This may reduce delays in responding to the critical state (e.g., security breach, structural failure). Classifying data, decision making based on the data, and/or other data analysis performed locally by the edge device may be referred to as "inference on the edge" in some applications.

While edge devices typically have long term data storage (e.g., hard drive, flash memory) as well as DRAM, to reduce size, energy consumption, and/or cost, many edge devices do not include full processing capabilities of a full-size computing device (e.g., server, desktop, laptop) and may lack a fully featured processor (e.g., AMD's Ryzen series, Intel's Core i9 series). Accordingly, the computing tasks that may be relegated to an edge device may be limited.

According to embodiments of the present disclosure, an edge device may include a memory, such as DRAM, which may include circuitry for performing pattern matching computations, referred to herein as pattern matching circuitry. In some embodiments, the pattern matching circuitry may include a comparator circuit and one or more registers in communication with the comparator circuit. One or more patterns from a cloud computing system or other computing device may be stored in at least one of the one or more registers. Data may be collected by the edge device and/or received by the edge device from one or more sensors. The data may be provided to a memory array of the memory. The data may be analyzed to determine whether or not the one or more patterns are present in the data (e.g., the data includes one or more pattern matches). The pattern matching may be performed by (e.g., on or on board) the memory and the data to be analyzed need not be provided outside the memory to other processing circuitry for pattern matching operations. Rather, in some embodiments, only the results of the pattern matching operations may be provided by the memory. The edge device may then use the result to perform a function (e.g., send a subset of the data to the cloud computing system, activate an alarm).

In some applications, performing the pattern matching operations on the memory and only providing the results may increase the computations that may be performed by the edge device without a fully featured processor. In some applications, performing the pattern matching operations on the memory may reduce the amount of data transmitted and/or the frequency of transmitting data between the edge device and the cloud computing system. In some applications, performing the pattern matching operations on the memory may reduce delays in reacting to critical states indicated by the data.

Figure 2:
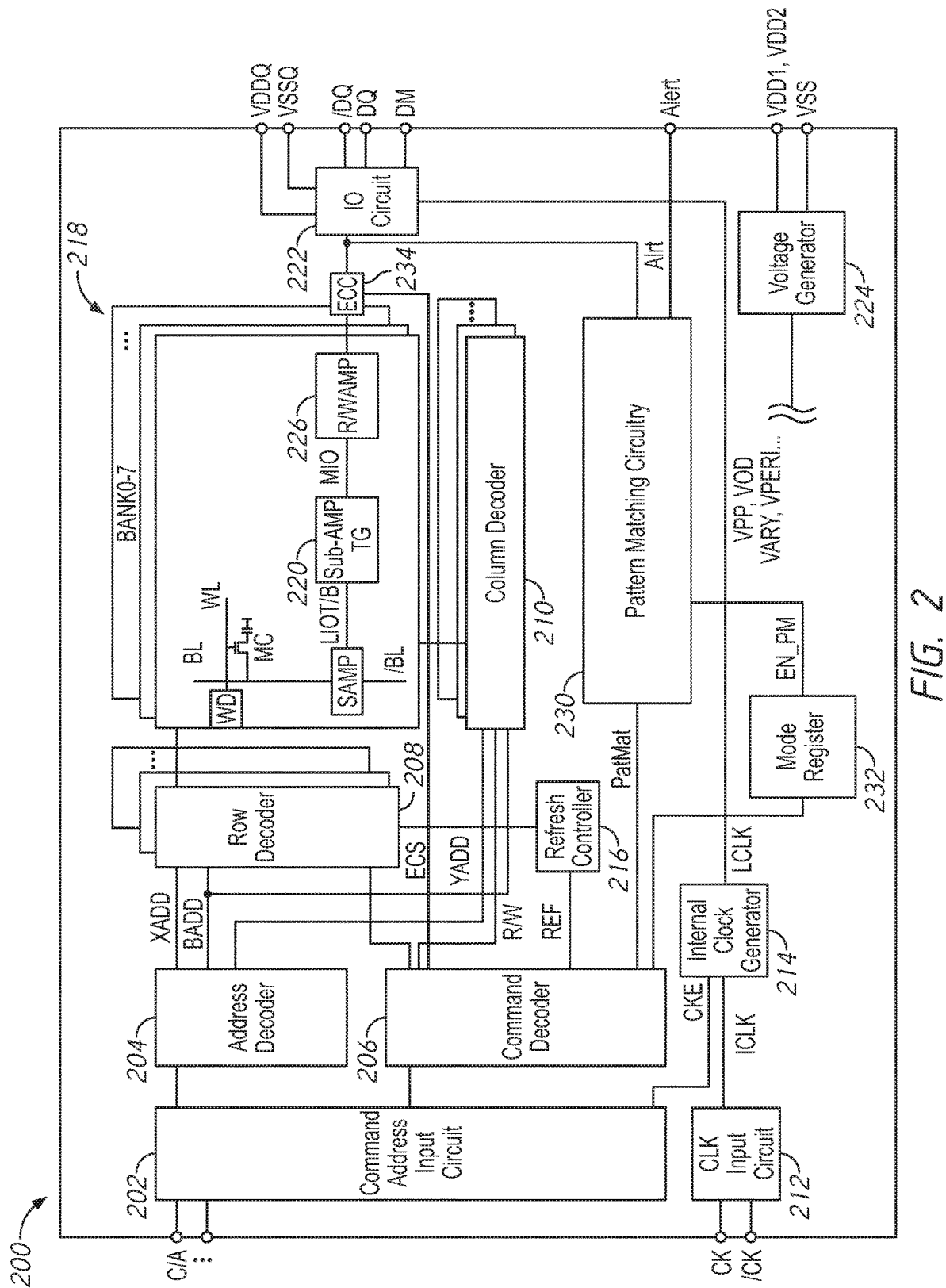
FIG. 2 is a block diagram of a semiconductor device according to embodiments of the present disclosure.

FIG. 2 is a block diagram showing an overall configuration of a semiconductor device 200 according to at least one embodiment of the disclosure. The semiconductor device 200 may be a semiconductor memory device, such as a DRAM device integrated on a single semiconductor chip.

The semiconductor device 200 includes a memory array 218. The memory array 218 is shown as including a plurality of memory banks. In the embodiment of FIG. 2, the memory array 218 is shown as including eight memory banks BANK0-BANK7. More or fewer banks may be included in the memory array 218 in other embodiments. Although FIG. 2 illustrates only one memory array 218, it is understood that the device 200 may include multiple memory arrays 218 in other embodiments. Each memory bank includes a plurality of word lines WL, a plurality of bit lines BL and/BL, and a plurality of memory cells MC arranged at intersections of the plurality of word lines WL and the plurality of bit lines BL and/BL. The selection of the word line WL is performed by a row decoder 208 and the selection of the bit lines BL and/BL is performed by a column decoder 210. A selected word line WL may be driven to a desired charge by word line driver WD. In the embodiment of FIG. 2, the row decoder 208 includes a respective row decoder for each memory bank and the column decoder 210 includes a respective column decoder for each memory bank. The bit lines BL and/BL are coupled to a respective sense amplifier (SAMP).

Read data from the bit line BL or/BL is amplified by the sense amplifier SAMP, and provided to sub-amplifier transfer gate 220 over complementary local data lines (LIOT/B). The sub-amplifier transfer gate 220 may act as a switch to form a conductive path between the appropriate LIOT/B and appropriate shared main data lines (MIO). Read data may pass from the local data lines LIOT/B to the main data lines MIO via a conductive path provided by the sub-amplifier transfer gate 220 to a read amplifier 226, which provides the data to an IO circuit 222. Write data received from IO circuit 222 is output from a write amplifier 226 and provided to the sense amplifier SAMP over the complementary main data lines MIO, the sub-amp transfer gate 220, and the complementary local data lines LIOT/B, and written in the memory cell MC coupled to the bit line BL or/BL.

The semiconductor device 200 may employ a plurality of external terminals for transmitting and receiving information from devices external to semiconductor device 200

(e.g., outside or off the memory), such as a memory controller (not shown in FIG. 2). The external terminals may include command and address (C/A) terminals coupled to a command and address bus to receive commands and addresses, and a CS signal, clock terminals to receive clocks CK and/CK, data terminals DQ to provide data, an alert pin ALERT for providing an Alrt signal, and power supply terminals to receive power supply potentials VDD1, VDD2, VSS, VDDQ, and VSSQ.

The clock terminals are supplied with external clocks CK and/CK that are provided to an input circuit 212. The external clocks may be complementary. The input circuit 212 generates an internal clock ICLK based on the CK and/CK clocks. The ICLK clock is provided to the command decoder 210 and to an internal clock generator 214. The internal clock generator 214 provides various internal clocks LCLK based on the ICLK clock. The LCLK clocks may be used for timing operation of various internal circuits. The internal data clocks LCLK are provided to the input/output circuit 222 to time operation of circuits included in the input/output circuit 222, for example, to data receivers to time the receipt of write data.

The C/A terminals may be supplied with memory addresses. The memory addresses supplied to the C/A terminals are provided, via a command/address input circuit 202, to an address decoder 204. The address decoder 204 receives the address and supplies a decoded row address XADD to the row decoder 208 and supplies a decoded column address YADD to the column decoder 210. The address decoder 204 may also supply a decoded bank address BADD, which may indicate the bank of the memory array 218 containing the decoded row address XADD and column address YADD. The C/A terminals may be supplied with commands. Examples of commands include access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 206 via the command/address input circuit 202. The command decoder 206 includes circuits to decode the internal command signals to generate various internal signals and commands for performing operations. For example, the command decoder 206 may provide a row command signal to select a word line WL and a column command signal to select a bit line BL. In another example, the command decoder 206 may provide a mode register command provided to a mode register 232 to select a memory operating condition, such as a memory condition that enables pattern matching operations according to embodiments of the present disclosure.

The device 200 may receive an access command which is a read command. When an activation command is received, and row and bank addresses are timely suppled with the activation command, followed by a read command and a column address is timely supplied with the read command, read data is read from memory cells MC in the memory array 218 corresponding to the row address and column address. The read command is received by the command decoder 206 (e.g., command controller), which provides internal commands so that read data from the memory array 218 is provided to the read amplifier 228. The read data is output to outside from the data terminals DQ via the input/output circuit 222.

The device 200 may receive an access command which is a write command. When an activation command is received, and row and bank addresses are timely suppled with the activation command, followed by a write command and a column address is timely supplied with the write command, write data supplied to the data terminals DQ is written to a memory cells in the memory array 218 corresponding to the row address and column address. The write command is received by the command decoder 206, which provides internal commands so that the write data is received by data receivers in the input/output circuit 222. Write clocks may also be provided to the external clock terminals for timing the receipt of the write data by the data receivers of the input/output circuit 222. The write data is supplied via the input/output circuit 222 to the write amplifier 226, and by the write amplifier 226 to the memory array 218 to be written into the memory cell MC.

The device 200 may also receive commands causing it to carry out a refresh operation. The refresh signal REF may be a pulse signal which is activated when the command decoder 206 receives a signal which indicates an auto-refresh and/or other refresh command. In some embodiments, the refresh command may be externally issued to the memory device 200. In some embodiments, the refresh command may be periodically generated by a component of the device 200. The refresh signal REF is provided to the refresh controller 216 (e.g., refresh control circuit). A refresh command provided to the refresh controller 216 may cause the device 200 to carry out refresh operations for one or more of the memory banks.

The refresh control circuit 216 supplies a refresh row address RXADD to the row decoder circuit 208, which may refresh one or more word lines WL indicated by the refresh row address. The refresh control circuit 216 may control a timing of the refresh operation based on the refresh signal. Responsive to an activation of the refresh signal, the refresh controller circuit 216 may generate and provide one or more refresh addresses.

One type of refresh operation may be an auto-refresh operation. Responsive to an auto-refresh operation the device 200 may refresh a word line or a group of word lines of the memory array 218, and then may refresh a next word line or group of word lines of the memory responsive to a next auto-refresh operation. The refresh control circuit 216 may provide an auto-refresh address as the refresh address which indicates a word line or a group of word lines in the memory array 218. The refresh control circuit 216 may generate a sequence of refresh addresses such that over time the auto-refresh operation may cycle through all the word lines of the memory array 218.

The device 200 may include error correction circuitry (ECC) 234 for detection and correction of errors in data written to and read from the memory array 218. The memory array 218 may include regions dedicated to storing parity information or device 200 may include an additional array for storing parity information (not shown). The ECC 234 may receive data from the memory array 218 and the parity information. When the ECC 234 detects an error in the data, the ECC 234 may correct the error and rewrite the corrected data back to the memory array 218. The ECC 234 may detect and correct errors responsive to read and/or write commands provided by the command decoder 206. The ECC 234 may periodically retrieve data from the memory array 218 to detect and correct errors in the memory array independent of read and/or write commands. For example, the command decoder 206 may periodically issue an error correction signal ECS to the ECC 234. Similar to the auto-refresh operation described above, the ECC 234 may cycle through all of the word lines of the memory array 218 over a series of error correction signals.

A mode register 232 may be used to define various modes of for the device 200. The mode register 232 may retain the stored information until it is reprogrammed, reset, or the device 200 loses power. The mode register 232 may be written via a mode register write command. The mode register 232 may include one or more registers for storing information related to the different memory operations or configurations. For example, the mode register 232 may be used to set burst length, burst type, latency, frequency set point, enable programmable termination components, enable certain memory operations, as well as others. The mode register 232 may also be programmed with information that can be read to provide status information about the device 200. For example, the mode register 232 may be used to provide a ready status, calibration status, as well as other status information. The information that is read may be programmed by circuits of the device 200. The mode register 232 may be read via a mode register read command. Reading the mode register 232 allows information about the status of operations and configurations to be provided by the device 200.

The mode register 232 may be used to specify a mode of operation in which pattern matching operations are performed by pattern matching circuitry 230. For example, when a particular value is written to the mode register 232, pattern matching operations may be implemented by the pattern matching circuitry 230 using signals provided to the memory, and when a different particular value is written to the mode register 232, the pattern matching operations may not occur (e.g., the pattern matching circuitry 230 may be disabled). A pattern matching operation may be performed by the pattern matching circuitry 230 in response to a one or more pattern matching commands in some embodiments. When the mode register 232 is programmed to enable pattern matching operations, the mode register 232 may provide a control signal EN_PM that enables pattern matching circuitry 230, which may include one or more registers and one or more comparator circuits (not shown in FIG. 2). When the pattern matching circuitry 230 is enabled by the control signal EN_PM from the mode register 232, the pattern matching circuitry 230 may respond to one or more pattern matching commands PatMat provided by the command decoder 206. Responsive to the one or more pattern matching commands, the pattern matching circuitry 230 may store a pattern in a register, perform a pattern matching operation on data stored in the memory array 218 to determine if the pattern is present in the data stored in the memory array 218, write a result of the pattern matching operation to a register, alter data in the array 218 based on the result of the pattern matching operation, provide the result from the register to the IO circuit 222, and/or provide an alert signal Alrt to an alert pin.

The pattern matching circuitry 230 may form an integral part of the device 200. For example, the pattern matching circuitry 230 may be formed in a same semiconductor die as the memory array 218. In some examples, the pattern matching circuitry 230 may be on a same printed circuit board as the memory array 218. In this manner, the pattern matching circuitry may be closer to a memory array than a processor or host device may be. For example, a latency or access time between the pattern matching circuitry 230 and the memory array 218 may be expected to be less than a latency or access time for passing data from the memory array 218 to output pins or external terminals of the device 200, such as when the data is provided to a processor or host external to the memory.

In some examples, data from the memory array 218 may be provided to the pattern matching circuitry 230 responsive to a read command and/or an internal read command. By "internal read" it is meant that data is retrieved from the memory array 218, but the data remains on device 200. That is, the data is not transmitted external to the memory, for example, via data terminals DQ. For example, responsive to a read compare command, data may be provided from the memory array 218 to pattern matching circuitry 230. In some examples, a refresh operation, in addition to activating the word lines to refresh the data stored therein, the data may be provided to the pattern matching circuitry 230 for pattern matching operations. That is, during the refresh operation, the data may be "internally read" by the device 200 when the word lines are activated for refreshing. In some examples, during error correction operations, in addition to being provided to the ECC 234, the data may be provided to the pattern matching circuitry 230 for pattern matching operations. In some examples, data for pattern matching operations may be provided to the pattern matching circuitry 230 responsive to both refresh operation and error correction operations. The manner of providing data for pattern matching operations may be defined by one or more pattern matching commands provided by the command decoder 206.

The source of data or patterns for pattern matching operations may be defined by one or more pattern matching commands provided by the command decoder 206. For example, the source of the pattern may be from the data terminals DQ via IO circuit 222, the memory array 218, and/or a second memory array (not shown). In some examples the data for the pattern matching operations may be received via the data terminals DQ via IO circuit 222 responsive to a write compare command. During a write compare operation, data is received from the data terminals DQ and provided to the pattern matching circuitry 230 for performing the pattern matching operation however, the data is not written to the memory array 218.

In some examples, mode register commands, pattern matching commands, and/or other commands provided by the command decoder 206 may be responsive to commands (e.g., control signals) received from a memory controller (not shown in FIG. 2, see FIG. 4) external to the device 200. Data may be received from and provided to the memory controller. According to embodiments of the present disclosure, the data and commands provided by the memory controller may be based, at least in part, on executable instructions of a machine learning application executed by processing circuitry in communication with the memory controller.

Power supply terminals of device 200 are supplied with power supply potentials VDD1, VDD2, and VSS. The power supply potentials VDD1, VDD2, and VSS are supplied to an internal voltage generator circuit 224. The internal voltage generator circuit 224 generates various internal potentials VPP, VOD, VARY, VPERI, and the like based on the power supply potentials VDD1, VDD2, and VSS supplied to the power supply terminals. While the various internal potentials and power supply potentials may be used for any of the different circuits of the device 200, the internal potential VPP is mainly used in the row decoder 208, the internal potentials VOD and VARY are mainly used in the sense amplifiers SAMP included in the memory array 218, and the internal potential VPERI is used in many peripheral circuit blocks.

The power supply terminals are also supplied with power supply potentials VDDQ and VSSQ. The power supply potentials VDDQ and VSSQ are supplied to the input/output circuit 222. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 222 so that power supply noise generated by the input/output circuit 222 does not propagate to the other circuit blocks.

The components of semiconductor device 200 (e.g., command decoder 206, mode register 232, pattern matching circuitry 230) may transmit and/or receive information with other components of semiconductor device 200 without accessing the external terminals (e.g., C/A, DQ). In some embodiments, the components may be coupled to one another by conductive traces for transmitting and/or receiving information (e.g., the PatMat line, EN_PM line, XADD line). Components that can communicate with other components of semiconductor device 200 without accessing the external terminals may be considered on semiconductor device 200 (e.g., "on memory" or "of the memory" when semiconductor device 200 is a memory device) and other components or devices that must access the external terminals of semiconductor device 200 to communicate with components of semiconductor device 200 may be considered off and/or outside semiconductor device 200 (e.g., "off memory" when semiconductor device 200 is a memory device).

Figure 3:
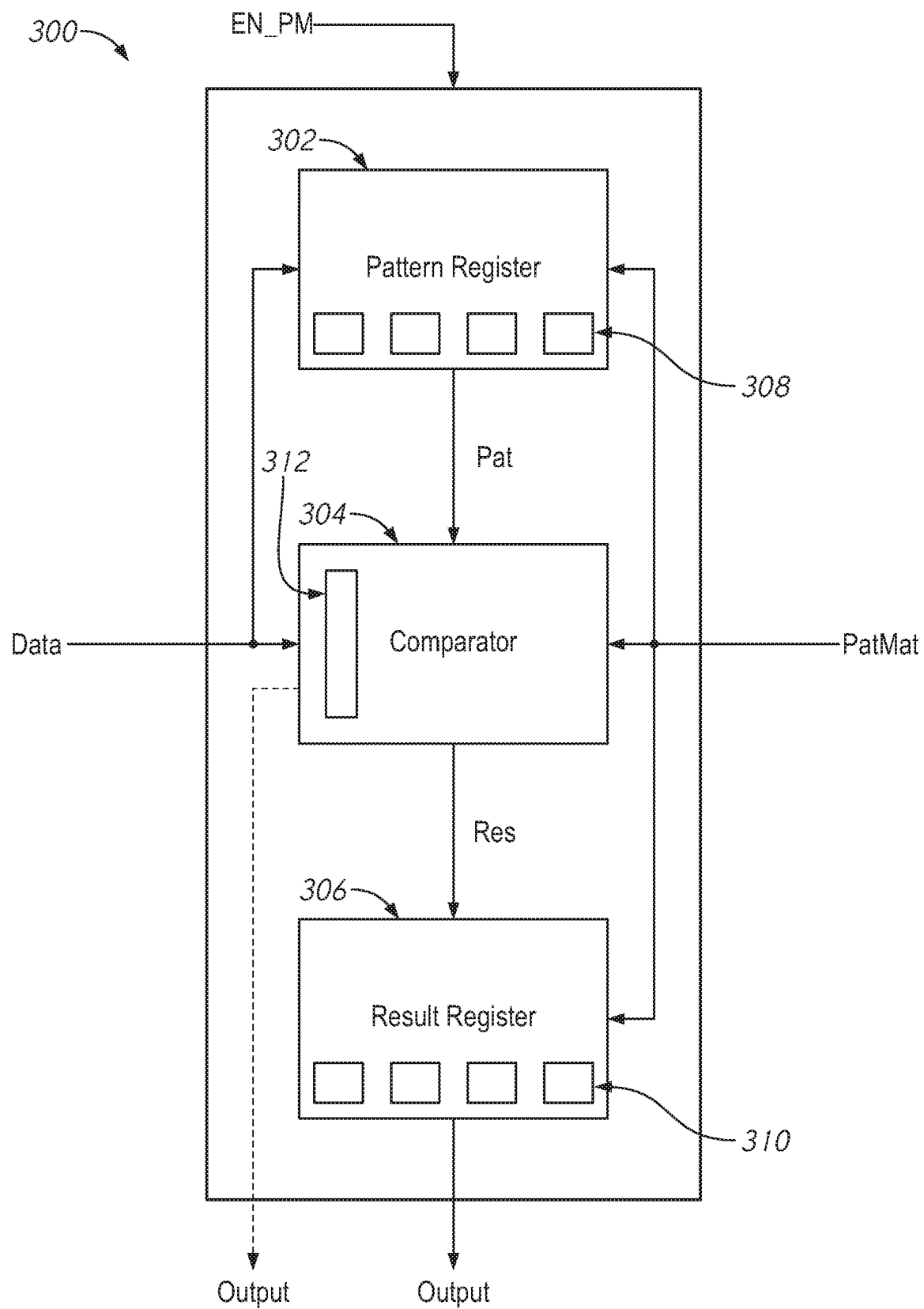
FIG. 3 is a block diagram of pattern matching circuitry according to embodiments of the present disclosure.

FIG. 3 is a block diagram of pattern matching circuitry 300 according to embodiments of the present disclosure. In some embodiments, pattern matching circuitry 300 may be included in pattern matching circuitry 230 shown in FIG. 2. The pattern matching circuitry 300 may include a pattern register 302, a comparator 304, and a result register 306.

The pattern matching circuitry 300 may be enabled by a control signal EN_PM. In some embodiments, the control signal may be provided by a mode register, such as mode register 232. The pattern matching circuitry 300 may ignore pattern matching commands when the control signal EN_PM is inactive (e.g., pattern matching circuitry 300 may be disabled). The pattern matching circuitry 300 may receive one or more pattern matching commands PatMat. In some embodiments, the pattern matching commands PatMat may be provided by a command decoder, such as command decoder 206. The pattern matching circuitry 300 may receive data, which may be provided to the pattern register 302 and/or comparator 304. The data may be provided from a memory array, such as memory array 218 and/or an IO circuit such as IO circuit 222.

The pattern register 302 may store one or more patterns to be used in a pattern matching operation. In some embodiments, the pattern register 302 may include multiple registers 308. Each register 308 may store one or more patterns. In some embodiments, the pattern register 302 may include a multipurpose register (MPR). In these embodiments, a pattern may be written to the pattern register 302 using an MPR write command. In other embodiments, a pattern may be written to the pattern register 302 responsive to a pattern register write command.

The comparator 304 may receive the pattern Pat from the pattern register 302 and data. The comparator 304 may perform a pattern matching operation to determine if the data includes Pat. In some embodiments, the comparator 304 may perform pattern matching operations for multiple patterns Pat, for example, when pattern register 302 includes more than one pattern. The pattern matching operations on multiple patterns may be performed sequentially or in parallel. In some embodiments, the comparator 304 may be hard coded to perform a single type of pattern matching operation. In other embodiments, the comparator 304 may be programmed (e.g., via a pattern matching command PatMat) to perform a particular type of pattern matching operation. The type of pattern matching operation may determine a type of comparison performed (e.g., find exact matches of Pat, find matches within a certain percentage of Pat, if Pat is a vector, find vectors in the data within a certain distance of the vector). Based on the determination of the pattern matching operation, the comparator may generate a result Res. In some embodiments, Res may include a count value of a number of times Pat is present in the data, a memory address of a location of a match of Pat in the data, a flag, and/or a combination thereof.

In some embodiments, the type of pattern matching operation may define the type of result generated as Res and/or other actions to be taken by the pattern matching circuitry 300 based on the result of the pattern matching operation. For example, in some embodiments, the pattern matching circuitry 300 may delete contents of the memory array where the data matches Pat or writing a pre-determined value to the memory array where the data matches Pat.

In some embodiments, the pattern matching command PatMat may define a source from which data is retrieved from for the pattern matching operation (e.g., the memory array and/or IO lines). In some embodiments, the pattern matching command PatMat may define a manner in which the data is retrieved such as via read operations, read compare operations, error correction operations, refresh operations. In some embodiments, the pattern matching command PatMat may define a number of operations performed to retrieve the data prior to performance of the pattern matching operation. For example, PatMat may indicate that data is to be received from the memory array responsive to a refresh operation. However, the refresh operation may only refresh one word line at a time, but a pattern to be matched may include data equivalent to four word lines. Thus, PatMat may further indicate that the pattern matching circuitry 300 may wait for four refresh operations prior to performing the pattern matching operation. In some embodiments, the pattern matching circuitry 300, and/or the comparator circuit 304 of the pattern matching circuitry 300, may include a buffer 312 for storing the data received by the prior operations.

In some embodiments, the comparator 304 may include comparator logic such as a plurality of XOR logic circuits. The number of logic circuits may be based, at least in part, on a length (e.g., number of bits) in the pattern to be matched. In some embodiments, the comparator 304 may include one or more content addressable memory (CAM) cells. Other logic circuits or other circuit components (e.g., operational amplifiers) may be included in the comparator 304 in some embodiments.

The result register 306 may store one or more results Res output by the comparator 304 responsive to the pattern matching operation. In some embodiments, the result register 306 may include multiple registers 310. Each register 310 may store one or more results. In some embodiments, the result register 306 may include a multipurpose register (MPR). In these embodiments, a result register 306 may be read using an MPR read command. In other embodiments, a result may be read from the result register 306 responsive to a result register read command. In some embodiments, the result may be provided as Output. In some embodiments, the result register 306 may provide the Output to an IO circuit, such as IO circuit 222. In some embodiments, the result register 306 may provide the Output to the memory array. In some embodiments, the result register 306 may generate a signal, such as an alert signal as the Output. The alert signal may be provided to an alert pin (see FIG. 2) in some embodiments.

Optionally, in some embodiments, the comparator 304 may provide the Output in addition to or instead of the result register 306. In these embodiments, the result register 306 may optionally be omitted.

Figure 4:
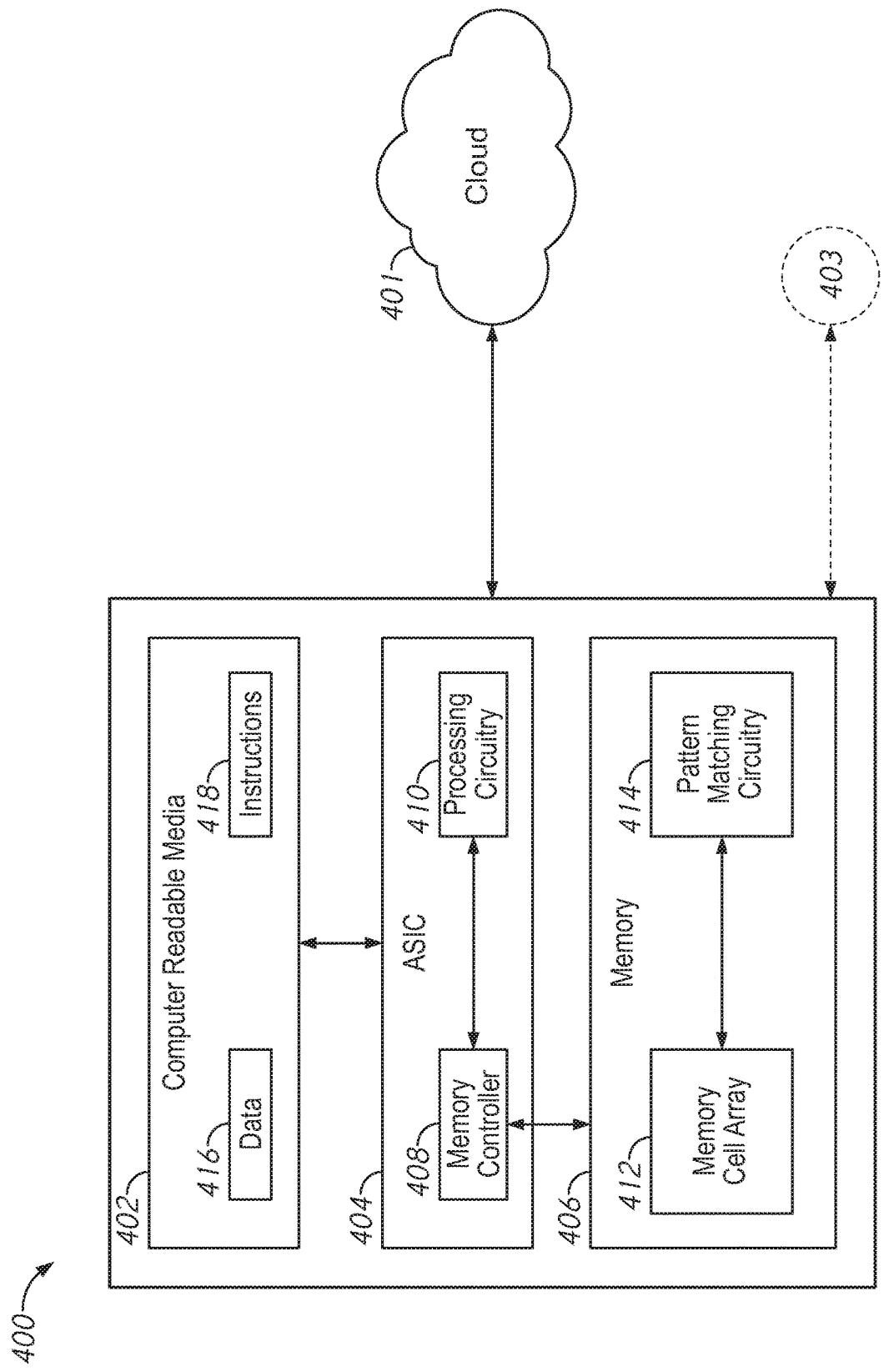
FIG. 4 is a block diagram of an edge device according to embodiments of the present disclosure.

FIG. 4 is a block diagram of an edge device 400 according to embodiments of the present disclosure. For context, a cloud computing system 401 and a sensor 403 in communication with the edge device 400 are also shown. In some embodiments, the edge device 400 may be used to implement the edge devices 104 of IoT system 100. In some embodiments, cloud computing system 401 may be used to implement cloud computing system 102. In some embodiments, sensor 403 may be used to implement sensors 108. The edge device 400 may include computer readable media 402, an ASIC 404, and a memory 406 in some embodiments.

The computer readable media 402 may be implemented using any media, including non-transitory computer readable media. Examples include memory, read only memory (RAM), read only memory (ROM), volatile or non-volatile memory, hard drive, solid state drives, or other storage. While a single computer readable media 402 is shown in FIG. 4, multiple media may be present. The computer readable media 402 may be used to store data 416 in some embodiments. The data 416 may include data received from the cloud computing system 401, a sensor 403, generated by computations performed by the ASIC 404, and/or another data source.

The computer readable media 402 may be encoded with executable instructions 418 to implement software and/or firmware components. In some embodiments, the executable instruction 418 may include instructions for implementing a driver. The driver may provide instructions for an operating system of the edge device 400 for interacting with one or more components of the edge device 400 (e.g., ASIC 404, and/or memory 406). In some embodiments, the executable instructions 418 may include instructions for implementing a pattern matching application, which may utilize pattern matching capabilities of the memory 406.

In some embodiments, the ASIC 404 may include a memory controller 408 and processing circuitry 410. The processing circuitry 410 may perform computations responsive to instructions provided by the computer readable media 402 in some embodiments. In some embodiments, the processing circuitry 410 may include transceiver circuitry configured to transmit and receive information from the cloud computing system 401, sensor 403, and/or another computing device. While in some embodiments, the processing circuitry 410 may have fewer computing capabilities than a traditional central processing unit (CPU) or other fully featured processor, the ASIC 404 may be smaller and/or require less power than a CPU or processor. While an ASIC 404 is shown in FIG. 4, other processing circuitry may be used in other examples (e.g., one or more controllers, microcontrollers, field programmable gate array (FPGA) circuits) which may also permit the edge device 400 to be small, low cost, and/or low power.

The ASIC 404 may provide and receive data from the memory 406 via the memory controller 408 in some embodiments. The memory controller 408 may control how data is input and output from the memory 406. The memory controller 408 may issue commands to the memory 406, such as mode register write commands, read, commands, write commands, and/or pattern matching operation commands. Although shown integrated with the ASIC 404 in FIG. 4, in other embodiments, the memory controller 408 may be a separate component in communication with the ASIC 404 and memory 406.

In some embodiments, memory 406 may include at least a portion of device 200. The memory 406 may include a memory cell array 412 (e.g., memory cell array 218) and pattern matching circuitry 414 (e.g., pattern matching circuitry 230, pattern matching circuitry 300). In some embodiments, the memory 406 may receive data (e.g., data 416, data generated by ASIC 404, and/or data received from sensor 403) and memory commands from the memory controller 408. The memory 406 may store the data in the memory cell array 412. In some embodiments, the memory 406 may further receive a pattern from the memory controller 408. The pattern may be stored in a register (e.g., pattern register 302) of the pattern matching circuitry 414 in some embodiments. In some embodiments, the pattern matching circuitry 414 may store multiple patterns. Responsive to a pattern matching command provided by the memory controller 408, the pattern matching circuitry 414 may perform a pattern matching operation on the pattern and the data stored in the memory cell array 412. A result of the pattern matching operation may be provided to the memory controller 408. In some embodiments, the result may then be provided to the processing circuitry 410 of the ASIC 404 and/or the computer readable media 402. In some embodiments, the edge device 400 may perform a function based on the result of the pattern matching operation. In some embodiments, the function may be performed based on computations performed by the processing circuitry 410. The computations of the processing circuitry 410 may be based, at least in part, on the result or a combination of the result and the executable instructions 418 in some embodiments.

In some embodiments, the patterns provided to the pattern matching circuitry 414 may be provided from the data 416, operations performed by the processing circuitry 410, provided by sensor 403, and/or provided from the cloud computing system 401. In some embodiments, the patterns may be loaded in one or more registers of the pattern matching circuitry and/or the computer readable media 402 prior deployment of the edge device 400. By deployment, it is meant that the edge device 400 is enabled and in communication with one or more devices in an IoT system (e.g., IoT system 100). The patterns may be provided by the cloud computing system 401 prior to deployment and/or another computing device (e.g., computing device 106), not shown in FIG. 4. The computing device may be wirelessly coupled or have a wired connection to edge device 400 prior to deployment for providing the patterns to the edge device 400. In some embodiments, at least some data 416 and/or the executable instructions 418 may be provided to the edge device 400 from the cloud computing system 401 and/or another computing device prior to and/or after deployment.

In some embodiments, the one or more patterns provided to the pattern matching circuitry 414 may correspond to values of particular interest (e.g., indications of critical states, indications of data required/desired for computations by the cloud computing system 401). For example, a pattern stored in the pattern matching circuitry 414 may correspond to a string indicating an error or a critical state. In some embodiments, the memory 406 may perform pattern matching operations on data provided to the memory 406 to determine of the pattern is present in the data and return a result. If the result indicates the pattern is present, the edge device 400 may perform a function based on the result.

For example, edge device 400 may be located in an electric car. The edge device 400 may collect data from a braking system of the car either directly or via a sensor 403 and transmit the braking data to the cloud computing system 401. Braking data may include when the brakes are applied, the duration for which the brakes were applied, the force with which the brakes were applied, and/or whether the brakes were applied correctly. The braking data may be stored as data 416 in some embodiments. Transmitting the braking data to the cloud computing system 401 while the electric car is in operation may put computational pressures on the electric car and/or may be difficult if the electric car does not have a reliable connection to the cloud computing system 401 while the electric car is in operation. Accordingly, in some examples, the edge device 400 may store the braking data during operation and transmit the braking data to the cloud computing system 401 when the electric car is coupled to a charging system. However, in some instances, it may be desirable to transmit (or attempt to transmit) at least some data to the cloud computing system 401 immediately, such as when the edge device 400 collects braking data that indicates the brakes did not apply correctly.

According to embodiments of the present disclosure, a pattern corresponding to an error in the braking system (e.g., an error pattern) may be stored in a pattern register of the pattern matching circuitry 414. Data collected from the braking system (e.g., from data 416 and/or directly from sensor 403) may be provided to the memory cell array 412. The pattern matching circuitry 414 may perform pattern matching on the data from the memory cell array 412 to determine if the error pattern is present and return a result. If the result indicates that the error pattern is not present, the edge device 400 may continue to collect and store braking system data for later transmission to the cloud computing system 401. If the result indicates that the error pattern is present, the edge device 400 may attempt to transmit the braking data including the error pattern and/or additional braking data to the cloud computing system 401 responsive to the result. In some embodiments, the result may be an active signal on an alert pin (e.g., alert pin shown in FIG. 2).

In some applications, only certain data is of interest to the cloud computing system 401. Returning to the electric car example above, the cloud computing system 401 may only want to receive braking data related to the error pattern. In these embodiments, the edge device 400 may only transmit braking data where the pattern matching circuitry 414 indicates the error pattern is present. In some embodiments, the edge device 400 may not store braking data where the error pattern is not present.

In some embodiments, the one or more patterns provided to the pattern matching circuitry 414 may be the result of training a machine learning model. The machine learning model may have been trained by the cloud computing system 401 in some embodiments. Thus, the heavy computational tasks required by machine learning applications may be performed by the cloud computing system 401 and secondary machine learning operations (e.g., detecting the patterns identified during training), which may require less computational power, may be performed by the edge device 400.

For example, the edge device 400 may be a heart monitor and/or sensor 403 may be a heart monitor that transmits electrocardiograph (ECG) signals. The ECG signals received by the edge device 400 may be provided to the cloud computing system 401 for analysis to detect heart conditions in a user whose heart is being monitored by the edge device 400 and/or sensor 403. In some examples, the ECG signals may be continuously transmitted to the cloud computing system 401 by the edge device 400. However, some heart conditions may be catastrophic (e.g., cardiac arrest) and delays in transmission between the edge device 400 and the cloud computing system 401 may be unacceptable and it may be desirable for the edge device 400 to detect these critical events locally.

According to embodiments of the present disclosure, a machine learning application may have determined patterns in ECG signals indicative of a critical event, such as cardiac arrest, through training (e.g., supervised or unsupervised) of a machine learning model (e.g., convolutional neural network). These patterns may be stored in a pattern register of the pattern matching circuitry 414. ECG signals collected by the edge device 400 (e.g., from data 416 and/or directly from sensor 403) may be provided to the memory cell array 412. The pattern matching circuitry 414 may perform pattern matching on the data from the memory cell array 412 to determine if one or more of the patterns associated with one or more critical events are present and return a result. If the result indicates that one or more critical event patterns are not present, the edge device 400 may continue to collect and transmit the ECG signals to the cloud computing system 401. If the result indicates that one or more of the critical event patterns are present, the edge device 400 may perform a function based on the result. For example, based on the result, the edge device 400 may activate an audible alarm (not shown), which may be integrated with the edge device 400 and/or in communication with the edge device 400 (e.g., alarm 110). In another example, the edge device 400 may transmit a signal to emergency personnel (e.g., call 911, trigger an alert at a nurse's station). In another example, the edge device 400 may activate another device (e.g., defibrillator, infusion pump), not shown, in communication with the edge device 400. In some embodiments, the result may be an indication of which pattern or patterns were detected in the ECG signals.

The examples provided herein are for illustrative purposes only and the principles of the present disclosure are not limited to the examples provided.

Figure 5:
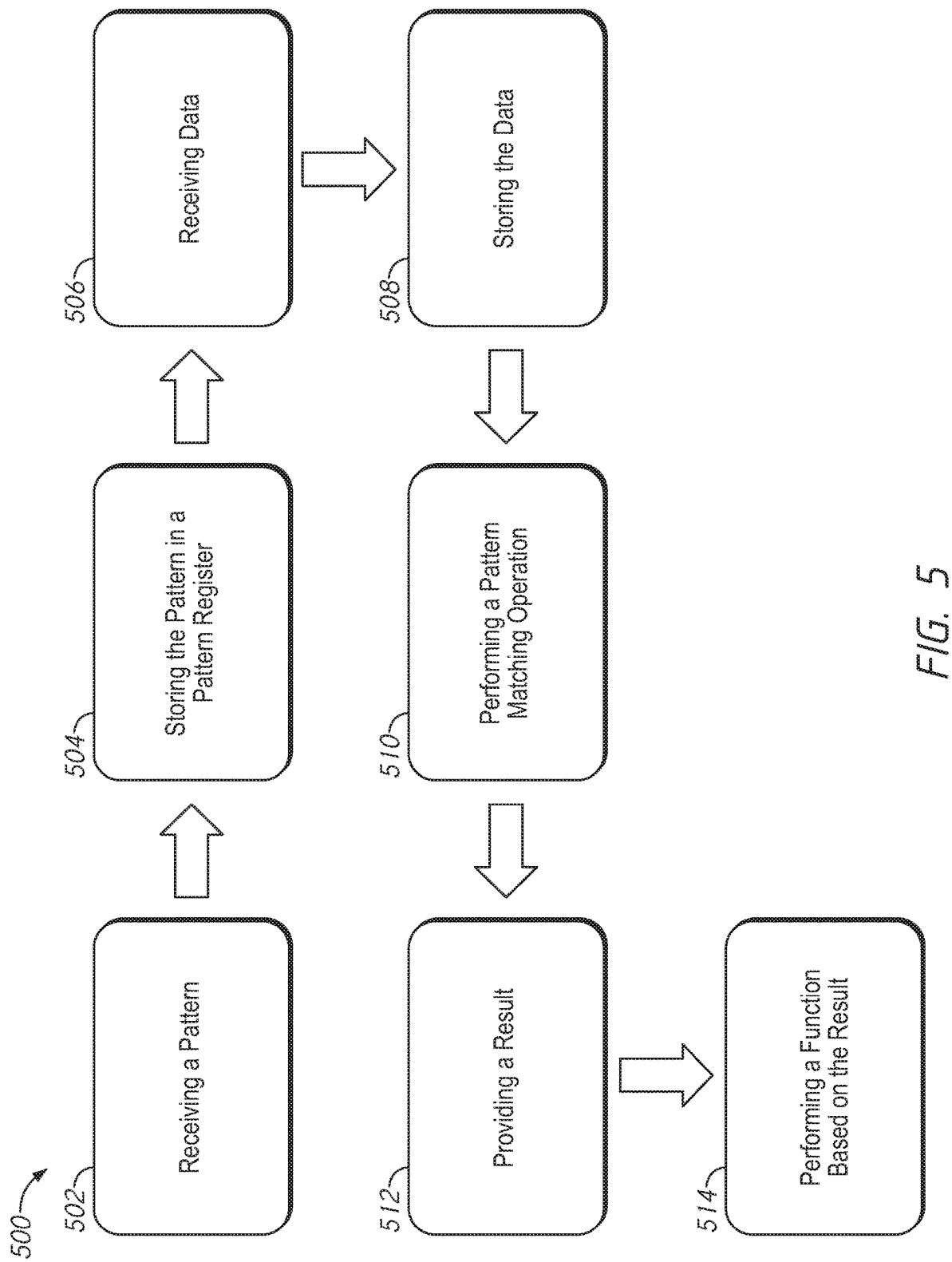
FIG. 5 is a flow chart of a method according to embodiments of the present disclosure.

FIG. 5 is a flow chart of a method 500 according to embodiments of the present disclosure. In some embodiments, at least a portion of method 500 may be performed by edge device 400, pattern matching circuitry 300, and/or device 200. The method 500 may summarize the methods performed in reference to the examples provided in reference to FIG. 1 and FIG. 4 in some embodiments.

At block 502 "receiving a pattern" may be performed. The pattern may be received by an edge device (e.g., edge device 400). The pattern may be received from a computing device (e.g., computing device 106) and/or a cloud computing system (e.g., cloud computing system 102, cloud computing system 401). The pattern may correspond to a value of interest and/or a critical state or event in some embodiments. In some embodiments, multiple patterns may be received. In some embodiments, the pattern may be a result of computations performed by a machine learning application and/or a big data analysis application. In some embodiments, the machine learning application and/or big data analysis application may be executed by the cloud computing system. At block 504 "storing the pattern in a pattern register" may be performed. In some embodiments, the pattern register may be included in a memory of the edge device, such as memory 406. In some embodiments, multiple patterns may be stored in the memory. In some embodiments, multiple patterns may be stored in a single pattern register. In other embodiments, patterns may be stored in multiple pattern registers of the memory.

At block 506 "receiving data" may be performed. The data may be received by the edge device. The edge device may collect the data directly and/or receive the data from a sensor (e.g., sensor 403, sensor 108). At block 508 "storing the data" may be performed. The data may be stored in a memory cell array (e.g., memory cell array 412, memory cell array 218) in some embodiments. In some embodiments, the data may further be stored in a computer readable media (e.g., computer readable media 402).

At block 510 "performing a pattern matching operation" may be performed. The pattern matching operation may be performed by pattern matching circuitry (e.g., pattern matching circuitry 230, pattern matching circuitry 300, pattern matching circuitry 414) of the memory of the edge device. In some embodiments, the pattern matching operation may be performed responsive to a pattern matching command. In some embodiments, the pattern matching command may be provided to the memory by a memory controller (e.g., memory controller 408. The pattern matching operation may generate a result.

At block 512 "providing a result" may be performed. As noted, the result may be the result of the pattern matching operation. In some embodiments, the result may be provided from the memory of the edge device to an ASIC (e.g., ASIC 404) or other processing circuitry of the edge device. In some embodiments, the result may be provided from a results register (e.g., result register 306) of the pattern matching circuitry. In some embodiments, the result may be provided directly from a comparator circuit (e.g., comparator circuit 304) of the pattern matching circuitry. In some embodiments, the result may provide an indication (e.g., an active or inactive alert signal) that the pattern is or is not present in the data. In some embodiments, the result may provide an indication of which pattern (if any) is present in the data. The result may be of a different type or a combination of types in other embodiments (e.g., number of times the pattern is present in the data).

At block 514 "performing a function based on the result" may be performed. In some embodiments, the function may be based, at least in part, on computations performed by processing circuitry (e.g., processing circuitry 410) of the edge device. In some embodiments, the function may be transmitting data from the edge device to the cloud computing system. In some embodiments, the function may be deleting data from computer readable media of the edge device. In some embodiments, the function may be activating an alert or another device in communication with the edge device. In some embodiments, other functions may be performed (e.g., denying execution of a financial transaction). In some embodiments, multiple functions may be performed based on the result (e.g., denying execution of a financial transaction and transmitting an alert of the transaction to an account manager).

In some embodiments, an edge device may process or reformat data prior to providing the data to a cloud computing system. Processing or reformatting the data may reduce the amount of data required to be transmitted and/or put the data into a better format for processing by the cloud computing system (e.g., a matrix including multiple feature vectors for a machine learning model). For example, the pattern received and stored at blocks 502 and 504 may allow an edge device to recognize redundant data in data received at block 506 during the pattern matching operation at block 510. If the result indicates the data is redundant at block 512, the edge device may delete the redundant data at block 514. In another example, multiple patterns may be received and stored at blocks 502 and 504. During the pattern matching operation at block 510, the edge device may determine what vector of a feature matrix a portion of data received at block 506 belongs in based on the result provided at block 512. At block 514, the edge device may put the data or portion of the data into the proper vector of the feature matrix. The feature matrix with data placed in proper columns may then be provided to a cloud computing system for input into a machine learning model of the cloud computing system.

The apparatuses, systems, and methods disclosed herein may allow edge devices including memory with on-memory pattern matching capabilities to perform more complex computational tasks while remaining small, inexpensive, and/or low power. The edge devices according to principles of the present disclosure may reduce an amount of data transmitted and/or a frequency at which data is transmitted to a cloud computing system in an IoT system in some applications. The edge devices according to principles of the present disclosure may perform functions locally without communicating with the cloud computing system in some applications.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative and should not be construed as limiting the appended claims to any particular embodiment or group of embodiments. Thus, while various embodiments of the disclosure have been described in particular detail, it should also be appreciated that numerous modifications and alternative embodiments may be devised by those having ordinary skill in the art without departing from the broader and intended spirit and scope of the present disclosure as set forth in the claims that follow. Accordingly, the specification and drawings are to be regarded in an illustrative manner and are not intended to limit the scope of the appended claims.

What is claimed is:

1. An apparatus comprising:
   a non-transitory computer readable medium configured to store executable instructions and data collected by an edge device;
   processing circuitry configured to execute the executable instructions; and
   a memory including pattern matching circuitry configured to:
      perform a pattern matching operation on at least a portion of the data and a pattern; and
      transmit a result of the pattern matching operation to the processing circuitry.

2. The apparatus of claim 1, further comprising a memory controller configured to provide to the memory at least the portion of the data to the memory and a command initiate the pattern matching operation, wherein the pattern matching operation is performed responsive to the command.

3. The apparatus of claim I, wherein the pattern matching circuitry includes a first register configured to store the pattern, a comparator circuit configured to perfoini the pattern matching operation, and a second register configured to store the result.

4. The apparatus of claim 3, wherein the memory includes a memory array configured to store the portion of the data and provide the portion of the data to the comparator circuit.

5. The apparatus of claim 1, further comprising a sensor coupled to the processing circuitry and configured to collect the data.

6. The apparatus of claim 1, further comprising a transceiver configured to transmit the data or the result, or both, to a cloud computing system.

7. The apparatus of claim 1, wherein the result includes an alert signal active if the pattern is present in the portion of the data and inactive if the pattern is not present in the portion of the data.

8. The apparatus of claim 1, wherein the pattern includes a plurality of patterns and the result includes an indication of which of the plurality of patterns is present in the portion of the data.

9. The apparatus of claim 1, wherein theprocessing circuitry is configured to deleting the portion of the data from the non-transitory computer readable medium based at least in part on receiving the result of the pattern matching operation.

10. The apparatus of claim 1, wherein the processing circuitry is configured to change a frequency at which the data is transmitted to a cloud computing system based at least in part on receiving the result of the pattern matching operation.

11. A system comprising:
an edge device comprising a memory including pattern matching circuitry configured to perform at least one pattern matching operation on at least a portion of data and at least one pattern; and
a computing device configured to generate the at least one pattern, provide the at least one pattern to the edge device for performing the at least one pattern matching operation, and receive data from the edge device, wherein at least some of the data is received responsive, at least in part, to the at least one pattern matching operation.

12. The system of claim 11, wherein the computing device is configured to train a machine learning model and the at least one pattern is generated, based at least in part, on the machine learning model.

13. The system of claim 11, wherein the computing device is further configured to provide at least one instruction to the edge device, wherein the at least one instruction indicates a function to be performed by the edge device based, at least in part, on a result of the at least one pattern matching operation.

14. The system of claim 11, wherein the computing device is further configured to provide the at least one pattern to a plurality of edge devices and receive data from the plurality of edge devices, wherein at least some of the data is received responsive, at least in part, to pattern matching operations performed by the plurality of edge devices.

15. A method comprising:
storing a pattern in a memory of an edge device;
storing data in the memory of the edge device; and
performing a pattern matching operation on at least a portion of the data and the pattern with pattern matching circuitry on the memory.

16. The method of claim 15, further comprising providing a result of the pattern matching operation to processing circuitry of the edge device, wherein the processing circuitry is configured to perform a function based, at least in part, on the result.

17. The method of claim 15, wherein the pattern is received by the edge device from a cloud computing system.

18. The method of claim 15, wherein the pattern is stored in a register of the pattern matching circuitry.

19. The method of claim 15, wherein the data is stored in a non-transitory computer readable medium of the edge device.

20. The method of claim 15, further comprising transmitting the data from the edge device to a cloud computing system based, at least in part, on a result of the pattern matching operation.

21. The method of claim 15, further comprising deleting data from at least one of the memory or a non-transitory computer readable medium of the edge device based, at least in part, on a result of the pattern matching operation.

22. The method of claim 15, further comprising activating an alarm or another device in communication with the edge device based, at least in part, on a result of the pattern matching operation.

23. The method of claim 15, wherein the data is received from a sensor in communication with the edge device.

* * * * *

UNITED STATES PATENT AND TRADEMARK OFFICE
CERTIFICATE OF CORRECTION

PATENT NO. : 11,676,052 B2
APPLICATION NO. : 16/849819
DATED : June 13, 2023
INVENTOR(S) : Debra M. Bell et al.

Page 1 of 1

It is certified that error appears in the above-identified patent and that said Letters Patent is hereby corrected as shown below:

In the Claims

| Column | Line | Claim | Reads | Should Read |
|---|---|---|---|---|
| 17 | 6 | 3 | The apparatus of claim I, | The apparatus of claim 1, |
| 17 | 8 | 3 | a comparator circuit configured to perfoini the | a comparator circuit configured to perform the |
| 17 | 28 | 9 | wherein theprocessing circuitry | wherein the processing circuitry |

Signed and Sealed this
Twenty-ninth Day of August, 2023

Katherine Kelly Vidal
*Director of the United States Patent and Trademark Office*